J. N. FULLER.
Clothes-Line Support.
No. 160,315.  Patented March 2, 1875.
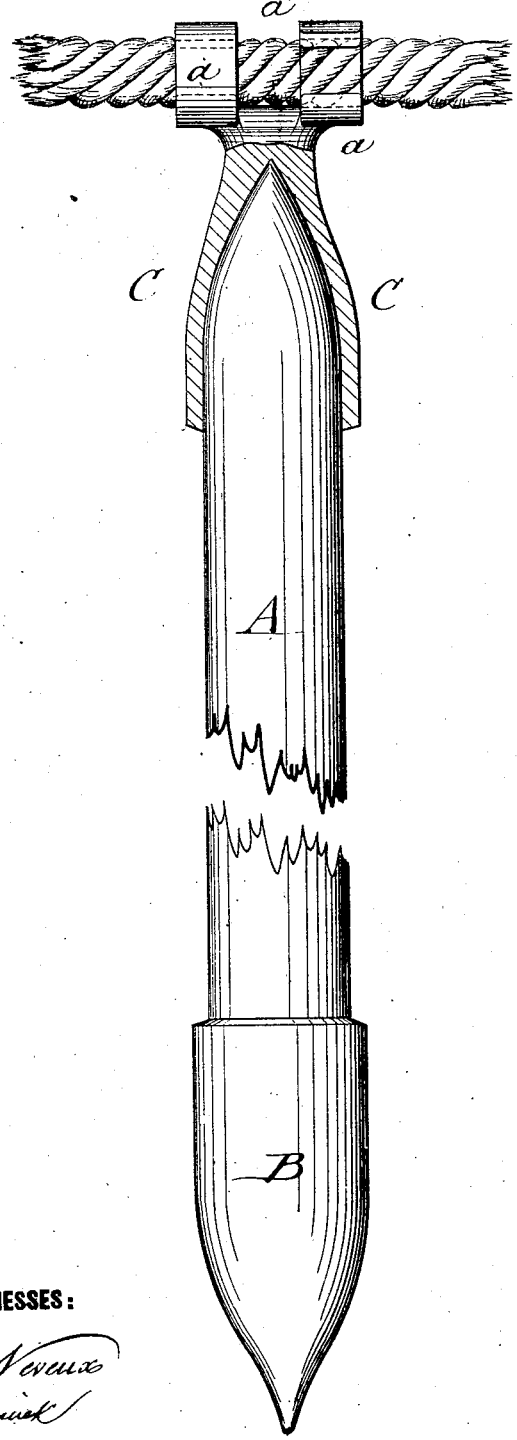
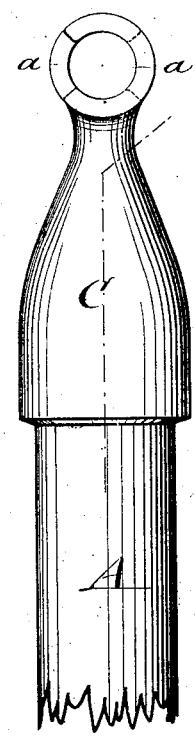
WITNESSES:
INVENTOR:
BY
ATTORNEYS.

UNITED STATES PATENT OFFICE.

JOHN N. FULLER, OF CLEVELAND, OHIO.

IMPROVEMENT IN CLOTHES-LINE SUPPORTS.

Specification forming part of Letters Patent No. 160,315, dated March 2, 1875; application filed June 13, 1874.

*To all whom it may concern:*

Be it known that I, JOHN N. FULLER, of Cleveland, in the county of Cuyahoga and State of Ohio, have invented a new and Improved Clothes-Line Supporter, of which the following is a specification:

In the accompanying drawing, Figure 1 represents a sectional side elevation of my improved clothes-line supporter or pole, and Fig. 2 an end view of the same.

Similar letters of reference indicate corresponding parts.

The invention will first be fully described, and then pointed out in the claim.

In the drawing, A represents a pole of suitable thickness and height; B, the pointed socket at the bottom end, and C the clothes-line-holding head-piece. The top or head-piece C consists of two circular prongs or hooks, a, which branch off, with suitable interval or recess a' between them, from the socket part of the piece C, the hooks being left open at opposite sides for admitting first the introduction of the rope or line into one hook, and then into the other, so as to be secured rigidly by the same, as indicated in Fig. 1. The pole or supporter is then raised with the clothes-line and firmly planted into the ground by the pointed socket, holding thereby the line in an elevated position in a very neat and safe manner, without the danger of swaying, dropping, or soiling the clothes, and other inconveniences incident to the present crude mode of fastening the clothes-lines.

I am aware that a pole pointed at both ends, one to receive a rope-holding socket, and the other to allow it to be conveniently driven into the ground, is old; but

What I claim is—

A clothes-line holder, C, having at the top two hooks, a a, with their openings on diametrically-opposite sides, and the space a' between them, as shown and described.

JOHN N. FULLER.

Witnesses:
Z. T. PENTZ,
GEO. A. GROOT.